United States Patent
Bremer et al.

(10) Patent No.: US 6,970,501 B1
(45) Date of Patent: Nov. 29, 2005

(54) METHOD AND APPARATUS FOR AUTOMATIC SELECTION AND OPERATION OF A SUBSCRIBER LINE SPECTRUM CLASS TECHNOLOGY

(75) Inventors: Gordon Bremer, Clearwater, FL (US); Philip J. Kyees, Largo, FL (US)

(73) Assignee: Paradyne Corporation, Largo, FL (US)

( * ) Notice: Subject to any disclaimer, the term of this patent is extended or adjusted under 35 U.S.C. 154(b) by 0 days.

(21) Appl. No.: 09/573,518

(22) Filed: May 17, 2000

Related U.S. Application Data
(60) Provisional application No. 60/134,590, filed on May 17, 1999.

(51) Int. Cl.[7] .................................................. H04B 1/38
(52) U.S. Cl. ....................... 375/222; 375/220; 375/377; 379/93.01
(58) Field of Search ............................... 375/219, 220, 375/221, 222; 379/27.01, 1.01, 93.01

(56) References Cited

U.S. PATENT DOCUMENTS

| | | | | |
|---|---|---|---|---|
| 5,636,037 A | * | 6/1997 | Saitoh | ........................ 358/442 |
| 5,781,617 A | * | 7/1998 | McHale et al. | .......... 379/93.14 |
| 5,812,786 A | * | 9/1998 | Seazholtz et al. | ........... 709/233 |
| 5,828,748 A | * | 10/1998 | Akhteruzzaman | ...... 379/399.01 |
| 5,912,895 A | * | 6/1999 | Terry et al. | ................. 370/445 |

* cited by examiner

Primary Examiner—Tesfaldet Bocure
Assistant Examiner—Pankaj Kumar
(74) Attorney, Agent, or Firm—Thomas, Kayden, Horstemeyer & Risley LLP

(57) ABSTRACT

The present invention provides a communication device, such as a modem, that is capable of detecting whether it is capable of operating in a mode that is compatible with one or more of the Spectrum Management Classes. The modem automatically selects a mode of operation that is compliant with one or more of the Spectrum Management Classes. The communication device also determines whether it is capable of operating in multiple modes that are compliant with multiple Spectrum Management Classes, and is capable of selecting the modes of operation that optimize the performance of the communication device. Furthermore, the communication device is capable of determining when it is not capable of operating in a mode that is compliant with at least one of the Spectrum Management Classes and which prevents operation of itself upon determining that it is not capable of operating in a mode that is compliant with at least one of the Spectrum Management Classes.

13 Claims, 4 Drawing Sheets

US 6,970,501 B1

METHOD AND APPARATUS FOR AUTOMATIC SELECTION AND OPERATION OF A SUBSCRIBER LINE SPECTRUM CLASS TECHNOLOGY

This application claim benefit of No. 60/134,590 filed May 17, 1999.

TECHNICAL FIELD OF THE INVENTION

The present invention relates generally to a method and apparatus for automatically selecting a subscriber line Spectrum Management Class technology mode of operation for communication over metallic subscriber loop cables. More particularly, the present invention relates to a communication device that automatically detects which of a plurality of Spectrum Management Classes the communication device is capable of operating in and selects a mode of operation that is compatible with one or more of the Spectrum Management Classes.

BACKGROUND OF THE INVENTION

The American National Standard for Telecommunications is developing a standard that sets forth spectrum management requirements and recommendations for the administration of services and technologies that use metallic subscriber loop wire pairs, commonly referred to as subscriber loops. The goal of the standard is to administer the loop plant in a way that provides spectral compatibility for services and technologies that use pairs in the same cable binder. The standard is particularly directed to minimizing the potential for cross-talk interference in twisted pair subscriber loop cables that are shared by multiple service providers (carriers). In situations where multiple service providers utilize twisted pairs in the same loop binders, services and technologies may interfere with each other if they are deployed in an uncontrolled manner. The standard provides spectrum management requirements and deployment recommendations for the administration of services and technologies in such an environment in a way that prevents or minimizes such deleterious effects.

The Spectrum Management Classes address (1) transmit signal power spectral density (PSD) requirements, (2) transmit signal average power requirements, (3) transverse balance requirements, (4) deployment restrictions based upon the subscriber loop characteristics, and (5) loop assignment guidelines. A communication device or system that meets all of the applicable requirements for one of the spectrum management classes is deemed to be in conformance with the standard. If a communication device or system does not meet all of the requirements associated with at least one of the spectrum management classes, the communication device or system is deemed to be non-compliant with the standard.

It would be desirable to provide a communication device, such as a digital subscriber line (DSL) modem, for example, that is capable of operating in a manner that is compatible with one or more of the spectrum management classes. It would also be desirable to provide a communication device that is capable of automatically detecting which of the spectrum management classes it is capable of operating in and of automatically selecting a mode of operation that is compatible with one of the spectrum management classes. Furthermore, it would be desirable to provide such a communication device that could detect when it is capable of operating in a mode that is compatible with more than one of these classes and that would automatically select a mode of operation that is compatible with the class that optimizes performance of the communication device. It would also be desirable to provide such a communication device that could detect when it is no longer capable of operating in a mode that is compatible with at least one of the spectrum management classes and which would prevent operation of the communication device when such a determination is made.

Although it is generally known for certain DSL modems and subscriber line technologies to have automatic and adaptive algorithms that seek to optimize performance, it is not known to provide a modem that detects compatibility with one or more spectrum management classes of the aforementioned standard and that selects the appropriate or best mode of operation based on that determination. For example, algorithms that automatically select transmit spectrum bandwidths and/or bandwidth locations are known. These algorithms are utilized to optimize performance in accordance with the ITU V.34 standard. The ITU V.34 standard also provides for adaptive equalizers and echo-cancelers.

Another type of automatic algorithm provided for by the ITU V.34 standard, which is often referred to as an auto-rating algorithm, provides for modifying a data transmission rate of a modem to allow the highest data rate possible to be utilized in the presence of certain line impairments. However, this algorithm is not truly "adaptive" because it is necessary to temporarily disrupt communication while the rate change is being accomplished. An auto-rate algorithm that is utilized with Multiple Virtual Lines (MVL) technology is known, which was developed by the assignee of the present application. The MVL auto-rating algorithm enables the rate change to be accomplished without disrupting communication. Therefore, the MVL auto-rating algorithm is adaptive.

Although the aforementioned algorithms seek to optimize performance, they do not take into account restrictions on transmit bandwidth and/or transmit power level or other types of restrictions that are in effect on a particular subscriber line on which they operate. These are examples of the types of restrictions that must be met in order to comply with the spectrum management classes defined in the standard. Therefore, these algorithms are not suitable for automatically selecting an appropriate mode of operation that is in compliance with one of the spectrum management classes.

A feature known as Spectrum Manager is used with Etherloop modems, which are marketed by a company known as Elastic Networks. Etherloop modems base the use of transmit spectrum on the presence or absence of other devices in the binder, i.e., on the presence or absence of other devices communicating on the same copper pair. Etherloop modems correlate an allowable use of spectrum to the length of the loop to which the modem is connected. The etherloop modem adjusts its usage of transmit spectrum based on a detection of cross-talk caused by other DSL systems in the binder.

However, the Etherloop modem does not adjust its use of spectrum based on loop parameters required for spectrum management class compliance. Furthermore, when an Etherloop modem is operating properly, it will, under many circumstances, select modes of operation that are not in compliance with the aforementioned spectrum management classes. Also, Etherloop modem adjustments are based on a measurement of transient conditions and other conditions that are difficult to measure. It is not based on measurement parameters that are directly related to the deployment rules associated with the spectrum management classes.

Accordingly, a need exists for a communication device, such as a modem, that is capable of detecting whether it is capable of operating in a mode that is compatible with one or more of the spectrum management classes and which automatically selects a mode of operation that is compliant with one of the spectrum management classes. A need also exists for such a communication device that is capable of determining whether it is capable of operating in multiple modes that are compliant with multiple spectrum management classes and which is capable of selecting the mode of operation that optimizes the performance of the communication device. A need also exists for such a communication device that is capable of determining when it is not capable of operating in a mode that is compliant with at least one of the spectrum management classes and which prevents operation of itself upon determining that it is not capable of operating in a mode that is compliant with at least one of the spectrum management classes.

SUMMARY OF THE INVENTION

The present invention provides a communication device, such as a modem, that is capable of detecting whether it is capable of operating in a mode that is compatible with one or more of the spectrum management classes and which automatically selects a mode of operation that is compliant with one of the spectrum management classes. The communication device determines whether it is capable of operating in multiple modes that are compliant with multiple spectrum management classes and which is capable of selecting the mode of operation that optimizes the performance of the communication device. The communication device is also capable of determining when it is not capable of operating in a mode that is compliant with at least one of the spectrum management classes and which prevents operation of itself upon determining that it is not capable of operating in a mode that is compliant with at least one of the spectrum management classes.

These and other aspects and advantages of the present invention will become apparent from to following discussion, drawings and claims.

DETAILED DESCRIPTION OF THE INVENTION

The present invention provides a Network Access Provider (NAP) Test Feature that enables one or more tests to be performed to determine which of multiple transceivers of a data communication equipment (DCE) device should be operating over a subscriber loop. The test(s) of the NAP test feature are utilized in accordance with the preferred embodiment of the present invention to determine which spectrum management class or classes a DCE device may operate in over the subscriber loop. It should be noted that the tests of the NAP Test Feature of the present invention are not limited to being used to determine which spectrum management class or classes a communication device may operate in on a subscriber loop. The present invention is capable of being utilized to determine the appropriate spectrum management class or classes defined in the aforementioned American National Standard for Telecommunications, although the present invention is not limited to being utilized for this purpose.

Figure 1:
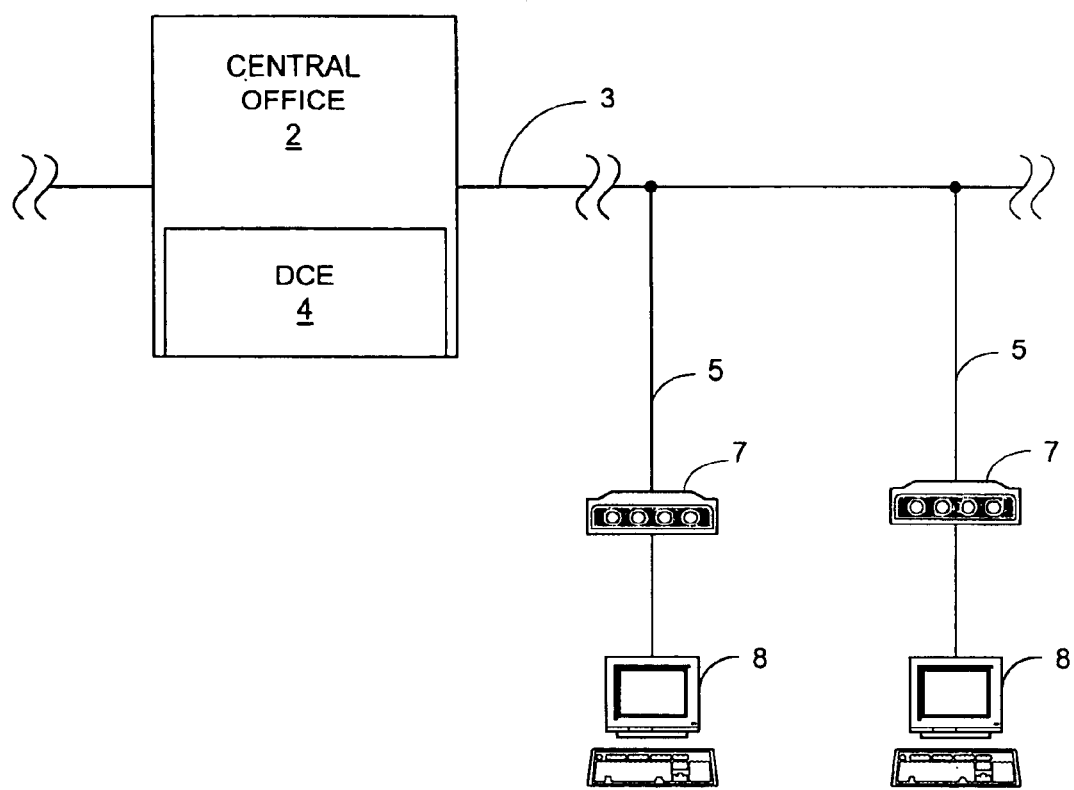
FIG. 1 is a block diagram illustrating a portion of the system in which the method and apparatus of the present invention may be implemented.

FIG. 1 is a block diagram illustrating the loop plant 3 that connects a central office (CO) 2 to several different subscriber premises, each of which comprises a DCE device 7 (e.g., an xDSL modem) and data terminal equipment (DTE) 8 (e.g., one or more computers). The CO 2 comprises at least one DCE 4 that is compatible with the DCEs 7 located at the subscriber premises. The loop plant represented by the line 3 is comprised of one or more twisted copper pairs, as is well known in the industry. The subscriber lines 5 are also twisted copper pairs that connect the subscriber premises to the loop plant 3. The subscriber lines 5 are normally viewed as being part of the loop plant 3. In accordance with the present invention, one or more tests are performed to determine the operating capability of the DCEs 4 and/or 7 located, respectively, at the CO 2 and at the subscriber premises. The DCE 4 located at the CO 2 preferably is an xDSL modem having similar or identical functional capabilities as those of the DCEs 7 located at the subscriber premises, which, as stated above, preferably are also xDSL modems.

Figure 2:
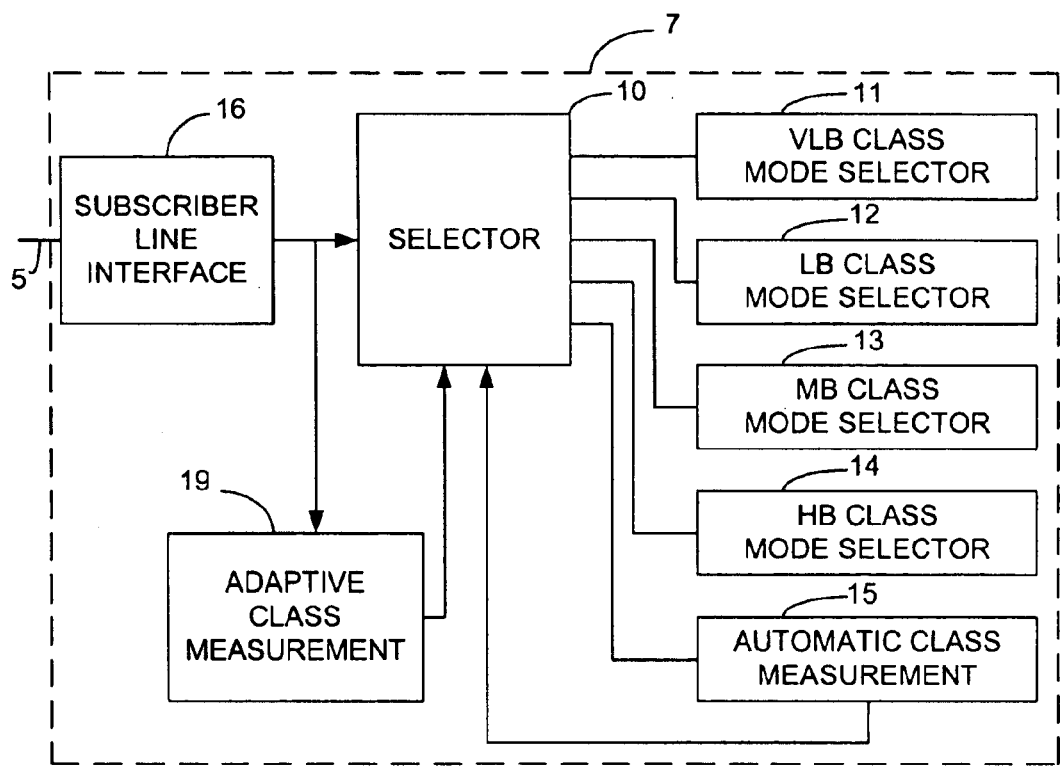
FIG. 2 is a block diagram illustrating the apparatus of the present invention in accordance with one exemplary embodiment.

By performing these test(s), one or more Spectrum Management Classes that the DCEs 4 and/or 7 are capable of operating in can be determined. FIG. 2 is a block diagram illustrating the apparatus of the present invention in accordance with one exemplary embodiment. The apparatus preferably is comprised in an xDSL modem, which is represented by each of the DCEs 4 and 7 shown in FIG. 1. Each of the DCEs 4 and 7 comprises four transceivers 11, 12, 13 and 14, which are available for connection, one at a time, to the subscriber line 5 via a selector 10 and the subscriber line interface 16.

Instead of one of the transceivers being connected to the subscriber line 5 at a particular time, the selector 10 can instead connect the Automatic Class Measurement device 15 to the subscriber loop 5 via the subscriber line interface 16. The Automatic Class Measurement device 15 is capable of performing certain tests to determine which of the transceivers 11, 12, 13 or 14 should be connected to the subscriber line 5. Once this determination has been made, the Automatic Class Measurement device 15 notifies the selector 10 as to which transceiver is to be connected. The manner in which this determination is made will be discussed below in detail with respect to the NAP tests of the present invention.

Connection of the appropriate transceiver to the subscriber line 5 enables the modem 7 to communicate with the DCE 4 located at the CO 2 within the determined Spectrum Management Class dictated by the physical characteristics of the subscriber line 5 (e.g., loop length, gauge, etc.). Once the appropriate transceiver has been connected, the Adaptive Class Measurement device 19 monitors the subscriber line 5 and determines whether the connected transceiver of the modem 7 is currently capable of communicating with the CO 2 within the particular Spectrum Management Class. If not, the transceiver is then taken out of service and the transceiver that is most appropriate for communicating within the current Spectrum Management Class with the DCE 4 of the central office 2 is connected to the subscriber loop 5 via the selector 10 and subscriber line interface 16. The manner in which the Adaptive Class Measurement device 19 performs these tasks will be discussed below with reference to the NAP tests of the present invention.

In the exemplary embodiment shown in FIG. 2, a transceiver is provided for four Spectrum Management Classes, namely, very low band symmetric (VLB) Class, the low band symmetric (LB) Class, the mid band symmetric (MB) Class and the high band symmetric (HB) Class. Upon measurement by the Automatic Class Measurement device 15 of the loop length and/or other loop parameters defined by the Spectrum Management Class deployment rules, the Spectrum Management Class or Classes that correspond to the measured parameters are identified as Allowable Classes. This measurement by the Automatic Class Measurement device 15 will occur automatically whenever a modem incorporating the invention is placed into service and powered on.

As stated above, at other times the Adaptive Class Measurement device 19 will measure parameters in an adaptive background manner to determine whether or not the Allowable Classes have changed. Both of the devices 15 and 19 are configured to be capable of controlling the selector 10 to connect the appropriate transceiver of the DCE 7 to the subscriber line 5. Furthermore, the Adaptive Class Measurement device 19 is capable of removing the currently connected transceiver from service and causing the most appropriate transceiver to be connected. The Adaptive Class Measurement device 19 preferably is configured to perform some or all of the loop qualification NAP testing capabilities described below in detail. Preferably, the communication device 1 at the CO 2 and the DCE 7 at the subscriber premises are configured to cooperate with each other in performing these tests. However, as discussed below, at least some of the tests may be performed by the DCE 4 at the CO 2 without a DCE 7 being located at the subscriber premises, and vice versa.

The Adaptive Class Measurement device 19 performs the tests necessary to determine the Spectrum Management Class or Classes for which the subscriber line 5 is qualified. It may then further determine from test results which compliant transceiver will provide best performance. In accordance with one aspect of the present invention, Pre-qualification Test(s) are performed to permit preliminary Class identification to be ascertained by the communication device 1 of the CO without the necessity of a subscriber premises test device (e.g., a DSL modem configured to cooperate with the communication device 1 during the test(s)). The Pre-qualification Test(s) permit more accurate Class identification to be performed from the CO 2 when being utilized in conjunction with a premises test device (e.g., a DSL modem 7).

Figure 3:
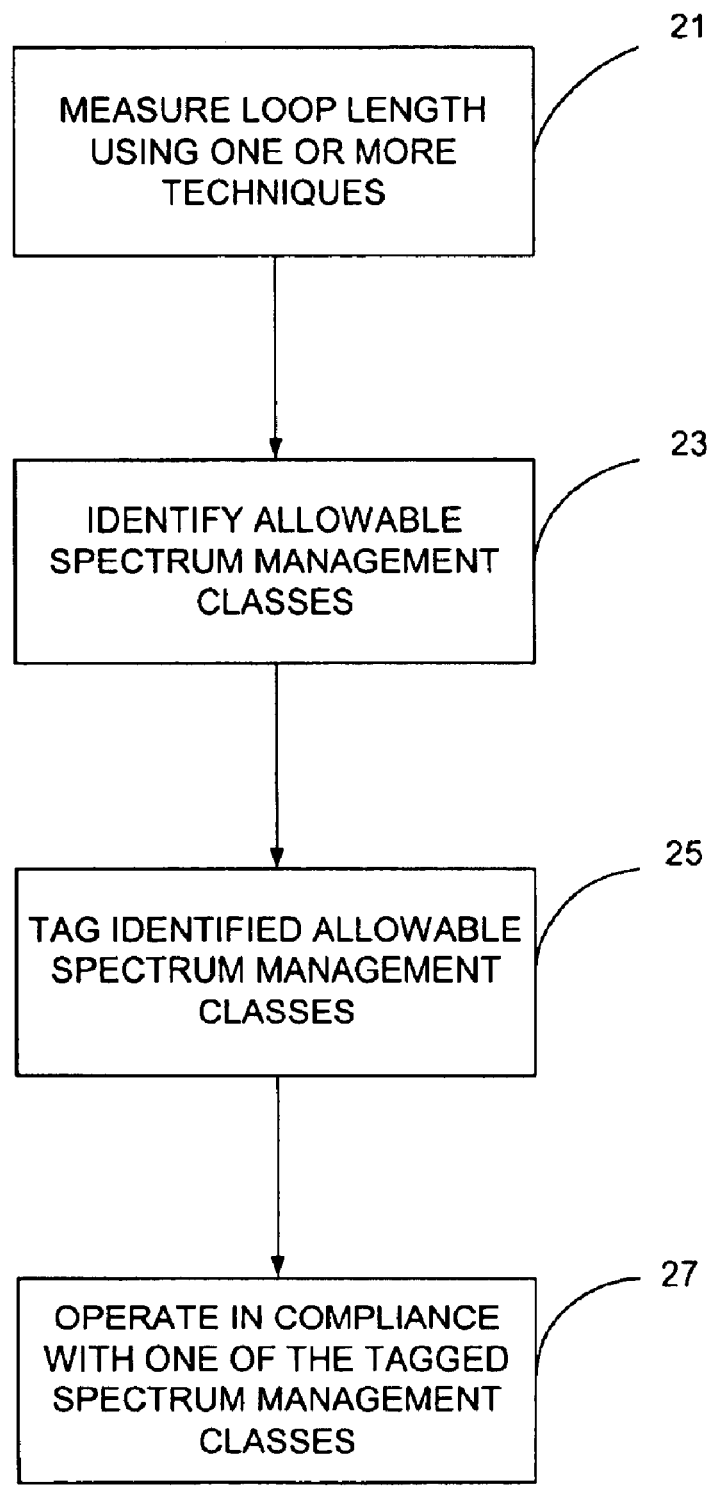
FIG. 3 is a flow chart representing an example of the manner in which the present invention can be used to determine whether one or more Spectrum Management Classes are available for communicating over the loop 3 and subscriber line 5 shown in FIG. 1.

FIG. 3 is a flow chart representing an example of the manner in which the present invention can be used to determine whether one or more Spectrum Management Classes are available for communicating over the loop 3 and subscriber line 5. This flow chart applies to situations where the determination is made with and without the premises test device, which is represented by the DSL modem 7. In this example, the loop length is measured to determine the available Spectrum Management Class or Classes, as indicated by block 21. The Allowable Spectrum Management Class or Classes are then identified at the CO 2 by the communication device 1 and/or at the subscriber premises by the modem 7. Preferably, the allowable Spectrum Management Class or Classes are tagged, as indicated by block 25. The most appropriate transceiver of the modem 7 is then selected and connected to the subscriber line 5 via selector 10 and subscriber line interface 16.

When the Automatic Class Measurement device 15 of the modem 7 is determining the allowable Spectrum Management Class or Classes, it will cause the selector 10 to select the appropriate transceiver for connection to the subscriber line 5. If the communication device 1 at the CO 2 is making the determination, it will send a command to the modem 7, once the modem 7 has been placed in operation, to cause the appropriate transceiver to be selected. The modem 7 will then operate in compliance with one of the allowable Spectrum Management Classes, as indicated by block 27.

In-Service Tests of the NAP test feature of the present invention are performed by the Adaptive Class Measurement device 19. This aspect of the present invention permits continual monitoring to determine and select the transceiver corresponding to the most appropriate Spectrum Management Class. If none of the transceivers 11, 12, 13, 14 and are capable of operating in compliance with the available Spectrum Management Class or Classes, the Adaptive Class Measurement device 19 will cause the modem 7 to cease operating.

Loop length or reach is a prime parameter used in establishing the allowable Spectrum Management Class. Measurement of this parameter can be made during In-Service Tests. The aforementioned ANSI standardized deployment rules for identifying the available Spectrum Management Class or Classes are not yet finalized and, even once finalized, are always subject to change. Therefore, rather than describing the manner in which the non-finalized rules may be applied to determine the allowable, or available, Spectrum Management Classes, the basic NAP tests of the present invention will be described and examples of the manner in which they can be applied to determine allowable Spectrum Management Classes will be provided.

The subscriber line 3/5 is comprised of a wire pair connecting the DCE 4 located at the CO 2 to the DCE 7 located at the subscriber premise. The pair may be comprised of, for example, a single wire gauge, typically AWG 24 or AWG 26. Alternatively, the pair may be of mixed gauge with some lengths of one gauge and some lengths of another gauge. The subscriber loop may have bridged taps attached to the wire pair at one or more points. Depending on the detailed Spectrum Management Class deployment rule definition of "reach", the parameters to be tested may vary. The following example is representative of the manner in which "reach" can be determined, but variations can be accommodated by the test methods of the present invention, as will be understood by those skilled in the art in view of the discussion provided herein. The following example assumes that the "reach" test is performed by either DCE 7 or DCE 4. It should also be noted that the "reach" test could also be determined by a device external to the DCEs 7 and 4, even a device manufactured by a manufacturer other than the manufacturer of the DCEs 4 and 7. The "reach" determination could then be entered into the Adaptive Class Measurement device 19, by a service technician, for example.

For exemplary purposes, it will be assumed that the standardized deployment rule definition of "reach" is the "equivalent length of an AWG 26 wire pair for the measured end-to-end loss vs. frequency, irrespective of any bridged taps. For this case, it is necessary to measure the end-to-end loss while identifying and discounting any effect of any bridged taps. The loss vs. frequency of an AWG 26 wire pair at any reach is well known. Therefore, if a determination is made that no bridged taps are present, a direct loss vs. frequency measurement can be compared with known AWG 26 reach tables and the loop reach can be determined from those tables. This method of determining reach is suitable even if the actual wire gauge is not AWG 26, or is of mixed gauge, because the deployment rule is only directed to determining "equivalent" length. Unfortunately, if no a priori information on bridged taps is available, bridged taps must be identified by the test and either compensated for by the testing signals or compensated for in the interpretation of the loss vs. frequency data, or both. The manner in which this determination is made will now be described.

A bridged tap at or very near one end of the loop, which is the typical case, is readily discoverable and quantifiable by test equipment at that end. The bridged tap creates a frequency dependent impedance that is a function of the length of the bridged tap. For example, the impedance associated with the bridged tap is typically lowest at a frequency of about 150 kHz/B, where B is the length of the bridged tap in kilofeet. A typical test signal generator with a non-zero output impedance, say 100 ohms, would be expected to transmit a signal that has a small loss vs. frequency variation when no bridged tap is present. However, since the bridged tap will normally introduce a lower impedance at the frequency identified above, the length of the bridged taps can be deduced by measuring at a test signal generator the signal level placed on to the wire pair.

The objective of this test is to disregard effects of bridged taps. Two approaches may be used to achieve this. The first approach is to set the test generator output impedance near zero so that the low impedance caused by the bridged tap is substantially inconsequential. The second is to equalize the transmit test signal. In both cases, the transmit test signal loss vs. frequency variation will be substantially negligible. By using either of these approaches at each end of the loop, a determination can be made as to (1) whether a bridged tap is present at either or both ends of the loop, and (2) the length of any bridged taps that are present. These determinations can then be used to overcome the influence of the taps on the end-to-end loss vs. frequency measurements.

Once the effect of bridged taps at or near the ends of the subscriber loop has been mitigated, end-to-end loss vs. frequency data can be obtained in each direction. However, it remains possible that bridged taps far from either end of the loop are present. It is probably not possible to accurately account for all such bridged taps in this manner. However, since the large majority of bridged taps are near one end of the loop and the large majority are less than 1000 ft from one end of the loop, restricting the loss vs. frequency to frequencies well below 150 kHz assures that the desired reach calculation of this example can be achieved.

Measurement of loop reach may be accomplished by transmitting from one end of the loop, such as from the CO 2, a signal with a known spectral content and measuring at the other end, such as at the DEC 7, the level at various frequencies across the frequency band of interest. Such a signal can be a swept sine wave as is used in classical spectrum analyzers or other test signals, which are well know in the art. By knowing the spectral content of the transmitted signal and of the received signal, the loss vs. frequency characteristics of the of the test signal over the channel can be determined, as will be understood by those skilled in the art. The same test can be performed to make this determination in both directions.

Figure 4:
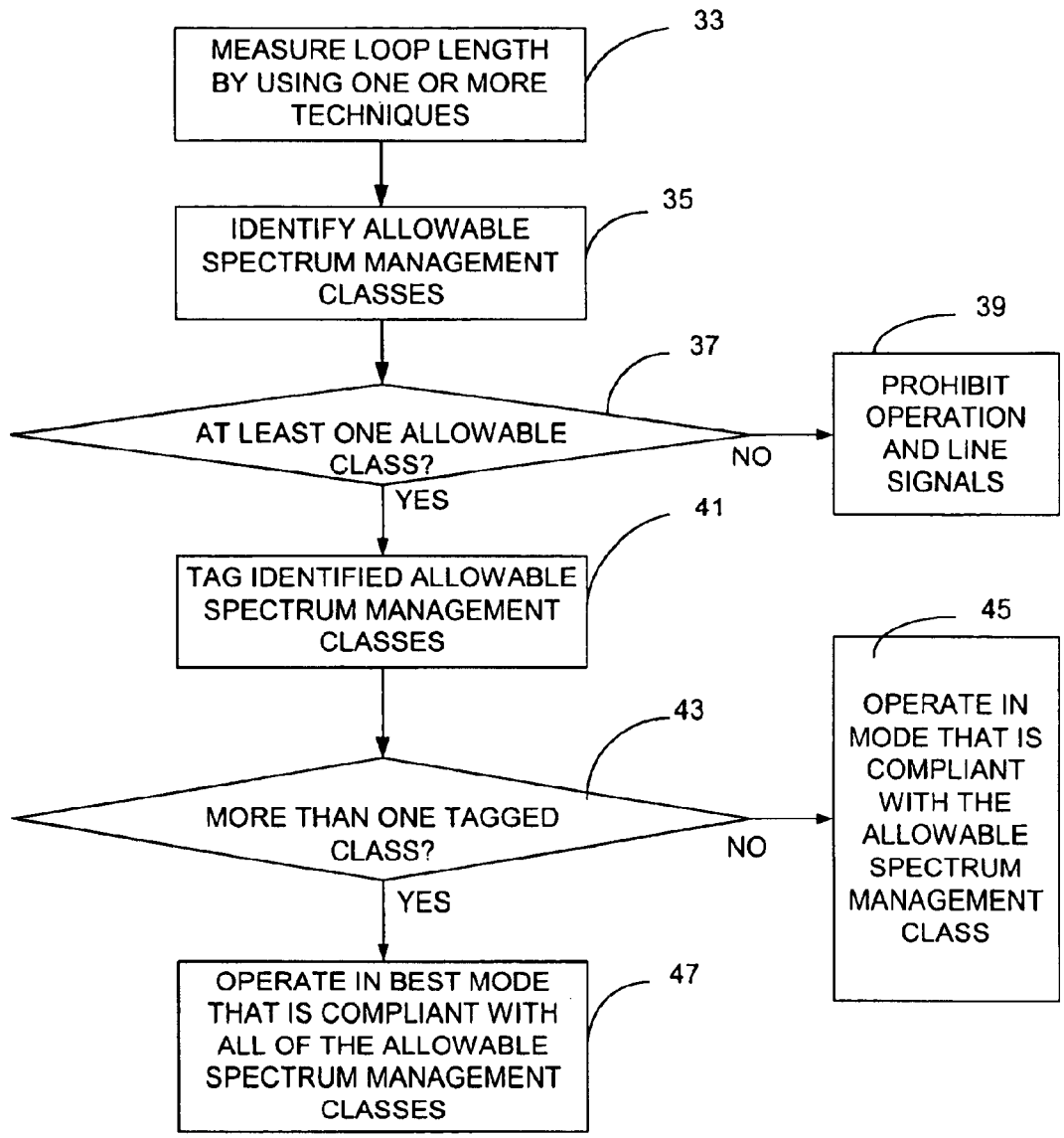
FIG. 4 is a flow chart demonstrating the method of the present invention in accordance with one exemplary embodiment, wherein the parameter being measured to determine the best mode of modulation is loop length.

It should be noted that, if a loop is classed at, for example, Spectrum Management Class LB, it is also useable for Class VLB DSLs since Class VLB falls within the requirements of Class LB. The test would then be to measure performance parameters and select the best modulation method that is compliant with both Class VLB and Class LB. This is demonstrated by the flow chart of FIG. 4. The example demonstrated in the flow chart of FIG. 4 assumes that the parameter being measured to determine the best mode of modulation is loop length. Therefore, loop length is measured, as indicated by block 33 to determine the allowable Spectrum Management Classes, as indicated by block 35.

Once the allowable Spectrum Management Classes, if any, have been identified, a determination is made as to whether any allowable Spectrum Management Classes exists, as indicated by block 37. If not, operation in the current modulation mode and line signals are prohibited, as indicated by block 39. If at least one allowable Spectrum Management Class has been identified, the allowable Spectrum Management Class(es) is tagged, as indicated by block 41. A determination is then made as to whether more than one allowable Class was identified, as indicated by block 43. If only one allowable Class has been identified, then the Adaptive Class Measurement device 19 causes the selector to select the transceiver (11, 12, 13, 14) corresponding to the mode of operations that is compliant with the Allowable Spectrum Management Class, as indicated by block 45.

If more than one allowable Class has been identified, then the Adaptive Class Measurement device 19 causes the selector 10 to select the transceiver (1, 12, 13, 14) corresponding to the best mode of operations that is compliant with each of the allowable Spectrum Management Class, as indicated by block 47. The following table lists classes of tests that are provided in accordance with the present invention. Each class of tests may be performed without a prerequisite performance of any other class of tests. That is, each class has a test set that provides results without need to perform other. Those skilled in the art will understand the manner in which these tests are performed.

| Class | Test Name | |
| --- | --- | --- |
| Pre-Qualification Tests | Premises modem not Operational POTS Available Loading Coils Present POTS Splitter Present Loop Length Prediction On/Off Hook Interfering POTS Activity DSL/CO Average Noise* DSL/CO Impulse Noise* DSL/CO Noise Spectrum* DSL/CO Crosstalk Type* DSL/CO Tonal Interferences* DCE Performance Prediction* | Note: Tests with an "*" may be performed and reported for both on/off-hook states. But test operator has no control over premises. |
| Qualification Tests Note: each multipoint premises DSL modem may be individually tested. | Premises modem Operational POTS Available Loading Coils Present POTS Splitter Present Loop Length Estimate Downlink Loop Characteristic, or DLC Uplink Loop Characteristic, or ULC On/Off Hook Phone Filter Present Interfering POTS Activity CO/DLC Non-Linear Distortion* | Note: Tests with an "*" are performed and reported for both on/off-hook states. Test operator may have control over premises. |

-continued

| Class | Test Name | |
|---|---|---|
| | Premises Non-Linear Distortion* | |
| | DSL/CO Average Noise* | |
| | Premises Average Noise* | |
| | DSL/CO Impulse Noise* | |
| | Premises Impulse Noise* | |
| | DSL/CO Noise Spectrum* | |
| | Premises Noise Spectrum* | |
| | DSL/CO Crosstalk Type* | |
| | Premises Crosstalk Type* | |
| | DSL/CO Tonal Interferences* | |
| | Downstream Data Rate* | |
| | Upstream Data Rate* | |
| In-Service Tests | 1. Premises modem Operational | Note: Tests with an "*" are performed and reported for both on/off-hook states. Test operator has control over premises. |
| | 2. On/Off Hook | |
| | 3. Downstream Data Rate* | |
| | 4. Upstream Data Rate* | |
| | 5. Downstream Block Test* | |
| | 6. Upstream Block Test* | |
| | 7. Downstream User Byte Count* | |
| | 8. Upstream User Byte Count* | |
| | 9. Downstream Data Efficiency* | |
| | 10. Upstream Data Efficiency* | |
| | 11. POTS State Change Count | |
| | 12. Retrain Count | |
| | 13. CO/DLC Receive Level | |
| | 14. Premises Receive Level | |
| | 15. CO/DLC Receive Ratio | |
| | 16. Premises Receive Ratio | |
| Service User Tests | 1. Modem Service Available | Note: Tests with an "*" are performed and reported for both on/off-hook states. Test operator has control over premises. |
| | 2. On/Off Hook | |
| | 3. Downstream Data Rate* | |
| | 4. Upstream Data Rate* | |
| | 5. Downstream Block Test* | |
| | 6. Upstream Block Test* | |

The Pre-Qualification Tests involve testing from a CO without a modem (i.e., a DSL modem) at the subscriber premises. Alternatively, the Pre-Qualification Tests could be performed by the modem located at the subscriber premises without the need for cooperation by the modem located at the CO. The accuracy of some of these tests is limited due to the absence of known termination and DCE equipment at the premises or at the CO. For purposes of explanation, it will be assumed that the Pre-Qualification Tests are to be performed by the modem located at the CO. The first objective of these tests is to estimate, prior to any premises installation, the likelihood that a modem, if installed at the subscriber premises, will perform according to the proposed service offering. The second objective of these tests is to identify impairments that may limit performance of the modem once installed at the subscriber premises.

The Qualification Tests involve testing from a modem at a CO in conjunction with a modem located at the subscriber premises, but with the premises modem service being disrupted or disabled. Each multipoint premises modem can be individually tested, if desired. The accuracy of these tests is high due to the use of the premises modem equipment in conjunction with the testing equipment located at the CO (DCE 4 shown in FIG. 1). The first objective of these tests is to establish premises modem performance compared to the proposed service offering. The second objective is to identify impairments that may limit the performance of the premises modem.

The In-Service Tests involve testing from a CO modem concurrent with and without interfering with normal service provided by the premises modem. Each premises modem can be individually tested, if desired. The accuracy of these tests is high. The first objective of these tests is to measure the premises modem performance according to the proposed service offering. A second objective is to report impairments that may lead to either performance improvements or the offering of higher performance services.

The Premises User Tests provide test results at a premises modem concurrent with normal operational service of the modem, i.e., without interrupting service provided by the premises modem. Each multipoint premises modem can be individually tested, if desired. The accuracy of these tests is high. The first objective of these tests is to provide information to the service user to permit direct assessment of performance from the premises modem to the CO without contacting the service provider. The second objective is to identify performance limiting impairments or attached POTS devices within the premises. Each multipoint premises modem can be individually tested, if desired.

It should be noted that although the modem located at the subscriber premises has been discussed only in terms of preferably being an xDSL modem, this is not a requirement of the present invention. However, the present invention preferably is directed to providing xDSL services between subscriber premises and a CO. The services are provided by a network service provider (NSP). Therefore, the CO DCE 4 and the DCEs 7 preferably are xDSL modems. The assignee of the present application has invented technology for implementation in xDSL modems known as multiple virtual line (MVL) technology. MVL DSL modems are capable of being utilized at a subscriber premise to enable multiple DTE devices, such as a facsimile machine and a personal computer, to operate simultaneously and communicate over a single telephone line coupling the subscriber premise to the CO. The present invention may be implemented in various types of DCE devices, including various xDSL modems and MVL xDSL modems.

Those skilled in the art will understand the manner in which these tests can be performed. Therefore, no further discussion of the manner in which any of these tests can be performed will be provided herein in the interest of brevity. Preferably, the tests of the present invention are implemented in software in the modem located at the subscriber premises, as well as in the modem located at the CO. As stated above, some tests are performed solely by the modem 4 located at the CO whereas others are performed solely by the modem 7 located at the subscriber premise. Others are performed in part by the subscriber premises modem 7 and in part by the modem 4 located at the CO 2. Therefore, only the code that is needed at those locations will need to be installed at those locations. It is desirable, but not required, to have the test software reside permanently in the same software codes used for operation of modems implementing xDSL and MVL/xDSL technology. In other words, either the test code itself, or modem operational code including the test code, would be selected, rather than loaded, to perform the testing routines. One reason for this is that some modem with which the present invention could be implemented may have difficulty running test software while simultaneously running multiple operational modem codes.

Therefore, the manner in which the test software is implemented may depend on the type of modem with which it is to be implemented. With respect to MVL technology, which was developed by the assignee of the present application, it is desirable for the test software to reside without change in progressive releases of MVL, even new classes of MVL technology are released. One reason for this is to maintain permanence of test results so that data collected in the past can be deemed to be reliable. Another reason is to provide independence of test code releases from operational code releases.

Preferably, test signal transmissions are generic so that received data can be (1) immediately analyzed, and (2) stored for later analysis, perhaps by analysis programs not yet in existence. It is also desirable for the test signal transmission (digital to analog writes) and test signal reception (analog to digital reads) to have rather short, finite lengths commensurate with memory and backhaul data capacities of the modem hardware (DSP and DSLAM hardware, respectively). In the case where the subscriber premise modem utilizes MVL/xDSL technology, it may be desirable for as much signal analysis as possible to be performed outside of the MVL operational system. That is, while the xDSL/MVL modem will generate and receive test signals upon command, the raw data received should be analyzed outside of this system by, for example, a personal computer (PC) so that performance of the MVL tasks is not limited by processing of the received test signal.

One possible architecture of the present invention will now be described with reference to a modem incorporating xDSL/MVL technology. It will be assumed that the tests are limited to tests that are not run in the MVL operational mode. The tests listed above can be categorized into either the operational mode or the test mode. Preferably, every MVL software code set would have both some MVL operating software and the Test Software of the present invention. When instructed, the Test Software would be enabled and test parameters would be loaded that would select the transmitted test signals, the cadence of these signals, and the capture of these signals. The Test Software would have a test signal generation capability (i.e., a digital-to-analog (D/A) write at the sample rate) and a test signal reception capability (i.e., an analog-to-digital (A/D) read at the sample rate). In all cases, the D/A writes and the A/D reads would occur simultaneously (including null D/A generation). A single counter would identify and label the transmit and receive sample pairs.

The test signal generations would be accomplished by one or more algorithms capable of generating periodic waveforms, including pseudo-random periodic waveforms. The objective here would be to utilize very small program space and very small data memory space. Each algorithm can have a parameters set, or the parameter set may be loaded from an external source. Loading the parameters from an external source provides great flexibility and use of test signals not yet known.

It should be noted that the present invention has been described with reference to preferred embodiments, but that the present invention is not limited to those embodiments. It should also be noted that, although the present invention preferably is implemented in software, the present invention may also be implemented solely in hardware, if so desired. If implemented in software, the software is not limited to being stored on any particular type of storage device. A suitable storage device for this purpose may be, for example, a magnetic storage medium, such as a magnetic disk, a solid state storage medium, such as random access memory (RAM) or read only memory (ROM), or an optical storage medium, such as an optical compact disk ROM (CD ROM). Therefore, the present invention is not limited with respect to the type of computer-readable medium employed for storing the software. Those skilled in the art will understand that various modifications may be made to the embodiments and features discussed above without deviating from the spirit and scope of the present invention.

What is claimed is:

1. An apparatus comprising:
   a modem connected to a subscriber loop, the modem being capable of operating in one or more modes that are compatible with one or more spectrum management classes defined by a standard, each spectrum management class defining power spectral density (PSD) requirements, the modem being configured to automatically select a mode that is compatible with at least one of the spectrum management classes;
   a plurality of transceivers, each transceiver corresponding to one of the modes, wherein the modem electrically couples a corresponding transceiver to the subscriber loop upon selecting one of the modes;
   a selector, the selector selecting one of the transceivers to be electrically coupled to the subscriber loop; and
   an Automatic Class Measurement device in communication with the selector, the Automatic Class Measurement device being configured to automatically select a mode that is compatible with at least one of the spectrum management classes and to cause the selector to select one of the transceivers to be electrically coupled to the subscriber loop.

2. The apparatus of claim 1, wherein the modem is further configured to detect when the modem is not capable of operating in a mode that is compatible with at least one of the spectrum management classes, and to prevent data transmission and reception upon such detection.

3. The apparatus of claim 1, wherein the modem is further configured to automatically select a mode that is compatible with at least one of the spectrum management classes by measuring subscriber loop length.

4. The apparatus of claim 1, further comprising:
   an Adaptive Class Measurement device in communication with the selector, the Adaptive Class Measurement device being configured to adaptively determine whether a current mode is not compatible with at least one of the spectrum management classes and to prevent data transmission and reception upon such determination.

5. An apparatus comprising:
   a modem connected to a subscriber loop, the modem being capable of operating in one or more modes that are compatible with one or more spectrum management classes defined by a standard, each spectrum management class defining power spectral density (PSD) requirements, the modem being configured to measure characteristics of the subscriber loop, the modem being further configured to automatically select, based on the measured characteristics, a mode that is compatible with at least one of the spectrum management classes;
   a plurality of transceivers, each transceiver corresponding to one of the modes, wherein the modem electrically couples the corresponding transceiver of the modem to the subscriber loop upon selecting a mode;
   a selector, the selector selecting one of the transceivers to be electrically coupled to the subscriber loop; and
   an Automatic Class Measurement device in communication with the selector, the Automatic Class Measurement device being configured to automatically select a mode that is compatible with at least one of the spectrum management classes and to cause the selector to select one of the transceivers to be electrically coupled to the subscriber loop.

6. The apparatus of claim 5, further comprising:
   an Adaptive Class Measurement device in communication with the selector, the Adaptive Class Measurement device being configured to adaptively determine whether a current mode of the modem is not compatible with at least one of the spectrum management classes and to prevent line signaling on such a determination.

7. The system of claim 5, wherein the modem provides a subscriber service, and the modem determines which of the spectrum management classes are compatible with the subscriber loop by performing a qualification test which disrupts the subscriber service.

8. The system of claim 5, wherein the modem provides a subscriber service, and the modem determines which of the spectrum management classes are compatible with the subscriber loop by performing a qualification test without interfering with the subscriber service.

9. The system of claim 5, wherein the modem, upon the determination of which of the spectrum management classes are compatible with the subscribe loop, automatically selects one of the modes that is compatible with one of the determined spectrum management classes.

10. The system of claim 5, wherein the modem is configured to detect when the modem is not capable of operating in a mode that is compatible with at least one of the determined spectrum management classes and to prevent data transmission and reception upon such detection.

11. The system of claim 5, wherein the modem is configured to determine which of the spectrum management classes are compatible with the subscriber loop by measuring subscriber loop length.

12. A system for communicating over a subscriber loop, the system comprising:

a first modem located at a subscriber premise, the first modem being capable of operating in one or more modes that are compatible with one or more spectrum management classes defined by a standard, each spectrum management class defining power spectral density (PSD) requirements;

a second modem located at a central office, the second modem being capable of operating in one or more modes that are compatible with one or more of the spectrum management classes;

a subscriber loop electrically coupling the first modem to the second modem wherein the first and second modems cooperate with each other to determine which of the spectrum management classes are compatible with the subscriber loop;

a plurality of transceivers, each transceiver corresponding to one of the compatible modes, wherein the modem electrically couples a corresponding transceiver to the subscriber loop upon selecting one of the modes;

a selector, the selector selecting one of the transceivers to be electrically coupled to the subscriber loop; and an Automatic Class Measurement device in communication with the selector, the Automatic Class Measurement device being configured to automatically select a mode that is compatible with at least one of the spectrum management classes and to cause the selector to select one of the transceivers to be electrically coupled to the subscriber loop.

13. The system of claim 12, further comprising:

an Adaptive Class Measurement device in communication with the selector, the Adaptive Class Measurement device being configured to adaptively determine whether a current mode is not compatible with least one of the spectrum management classes and to prevent data transmission and reception upon such determination.

* * * * *

UNITED STATES PATENT AND TRADEMARK OFFICE
CERTIFICATE OF CORRECTION

| | |
|---|---|
| PATENT NO. | : 6,970,501 B1 |
| DATED | : November 29, 2005 |
| INVENTOR(S) | : Bremer et al. |

It is certified that error appears in the above-identified patent and that said Letters Patent is hereby corrected as shown below:

<u>Column 8,</u>
Line 32, delete "1" and replace with -- 11 --.

Signed and Sealed this

Seventh Day of March, 2006

JON W. DUDAS
*Director of the United States Patent and Trademark Office*